United States Patent Office 3,501,522
Patented Mar. 17, 1970

3,501,522
DERIVATIVES OF 1,3-BIS(HEPTAFLUORO-ISOPROPYL)BENZENE
Basil S. Farah, West Seneca, N.Y., and Everett E. Gilbert and Benjamin Veldhuis, Morris Township, Morris County, N.J., assignors to Allied Chemical Corporation, New York, N.Y., a corporation of New York
No Drawing. Filed Sept. 7, 1965, Ser. No. 485,607
Int. Cl. C07c *143/40, 143/24, 143/70*
U.S. Cl. 260—505
8 Claims

ABSTRACT OF THE DISCLOSURE 5-sulfo - 1,3 - bis(heptafluoroisopropyl)benzene and its corresponding metal and ammonium salts, sulfonyl chloride and sulfonyl fluoride are derived from 1,3-bis(heptafluoroisopropyl)benzene. 5-sulfo - 1,3 - bis(heptafluoroisopropyl)benzene and its metal and ammonium salts are useful as a surface tension reducing agent, wetting agents and dispersing agents. The metal and ammonium salts are also useful as insecticides. The sulfonyl chloride and fluoride are useful for treating fabrics to render them stain repellent.

---

This invention relates to new and useful derivatives of 1,3-bis(heptafluoroisopropyl)benzene. More particularly, the invention relates to 1,3-bis(heptafluoroisopropyl)benzenesulfonic acid and its corresponding metal or ammonium salts, sulfonyl chloride and sulfonyl fluoride.

The novel sulfonic acid and its metal or ammonium salts (sulfonates) have surface active properties rendering them suitable for use as surface tension reducing agents, wetting agents, dispersing agents, etc. The sulfonates are also useful as toxicants for combatting certain insects. The novel sulfonyl chloride and fluoride may be employed for treating fabrics to render them oil repellent (oleophobic).

The sulfonic acid may be represented by the formula:

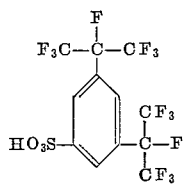

The sulfonates may be represented by the formula $(RSO_3)_nM$ wherein R is

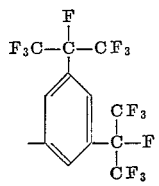

M is a metal atom, preferably an alkali metal atom such as sodium and potassium, or ammonium radical and $n$ is the number of $RSO_3$ groups bonded thereto (which is 1 in the case of monovalent M). Other metals represented by M include lithium, calcium, barium and zinc.

The sulfonyl chloride may be represented by the formula:

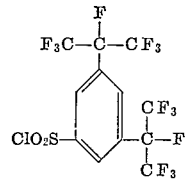

The sulfonyl fluoride may be represented by the formula:

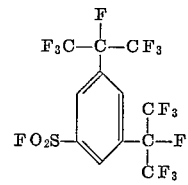

The sulfonic acid, sulfonyl chloride and sulfonyl fluoride of the invention may be prepared by reacting 1,3-bis(heptafluoroisopropyl)benzene with sulfur trioxide, chlorosulfonic acid and fluorosulfonic acid, respectively. The metal and ammonium sulfonates may be prepared by reacting the sulfonic acid with a metal oxide or a metal or ammonium hydroxide.

1,3 - bis(heptafluoroisopropyl)benzene, a novel compound itself, is prepared by reacting 1,3-bis(2-hydroxy-hexafluoro-2-propyl)benzene with sulfur tetrafluoride. The reaction is believed to occur as follows:

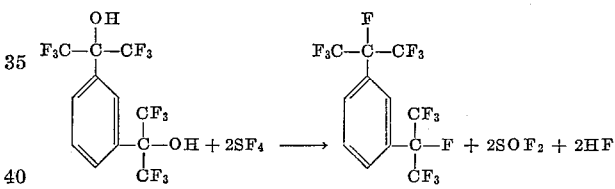

In preparation of the sulfonic acid, it is preferred to use a stabilized form of liquid sulfur trioxide. The reaction is carried out using about 1 to 10 mols of sulfur trioxide per mol of starting material. The reaction temperature is maintained at about 40° to 100° C. for a period of at least about 6 hours. Of course, higher temperatures and shorter periods can be used when superatmospheric pressures are employed.

In preparation o fthe sulfonyl chloride and sulfonyl fluoride, it has been found desirable to first form the sulfonic acid, as described above, and then to react the acid with chlorosulfonic acid or fluorosulfonic acid. The reaction with chlorosulfonic or fluorosulfonic acid is carried out using about 2 to 8 mols of the acid per mol of starting material. The reaction temperature is maintained at about 100° to 145° C. for at least about 24 hours.

In preparation of the sulfonates, the sulfonic acid is neutralized with an aqueous solution of a metal oxide or a metal or ammonium hydroxide, preferably an alkali metal hydroxide. The temperature is maintained during the reaction at about 10° to 90° C.

The following examples, in which parts are by weight, illustrate preparation of the novel starting material and derivatives of the present invention.

EXAMPLE 1

Preparation of 1,3-bis(heptafluoroisopropyl)benzene 520 parts of 1,3-bis(2-hydroxy-hexafluoro-2-propyl)-benzene and 500 parts of sulfur tetrafluoride were charged into a rocking autoclave. The autoclave was sealed and heated at 125° C. for 8 hours. A pressure of 500 p.s.i. developed during the reaction. After cooling to room temperature, the autoclave was vented and the contents were poured into about 500 parts of water. Aqueous and organic layers formed. The organic layer was withdrawn and washed with about 55 parts of 10% sodium hydroxide to neutralize any acid and to remove unreacted starting material. The organic material was then dried over sodium sulfate and subjected to fractional distillation. 480 parts of 1,3-bis(heptafluoroisopropyl)benzene having a boiling point of 152–154° C. were obtained.

Infrared spectrum analysis of the product showed characteristic "meta" absorption bands at 5.0 and 6.0 microns and strong $CF_3$ absorption bands between 7.5 and 8.5 microns. Elemental analysis of the product gave the following results:

Calculated (percent): F, 64.3, H, 0.97. Found (percent): F, 62.7, H, 0.87.

EXAMPLE 2

Preparation of 1,3-bis(heptafluoroisopropyl)benzenesulfonic acid

A mixture of 153 parts of 1,3-bis(heptafluoroisopropyl)benzene and 88 parts of stabilized liquid sulfur trioxide were refluxed (62° to 86° C.) in a reaction vessel for 6 hours. 40 parts of additional stabilized liquid sulfur trioxide were introduced into the vessel, and excess sulfur trioxide was distilled off until the pot temperature reached 110° C. The reaction mixture was dissolved in about 3000 parts of water. The mixture was then extracted with about 566 parts of diethyl ether, and the diethyl ether was distilled off under vacuum to give 188 parts of a white solid constituting 1,3-bis(heptafluoroisopropyl)benzenesulfonic acid.

EXAMPLE 3

Preparation of sodium 1,3-bis(heptafluoroisopropyl)benzenesulfonate

To 5.2 parts of 1,3-bis(heptafluoroisopropyl)benzene in a reaction vessel were added 3 parts of stabilized liquid sulfur trioxide. The resulting mixture was heated under reflux for 6 hours, during which time the temperature rose from 47° C. to 66° C. The mixture was poured into ice-water, forming an aqueous solution of 1,3-bis(heptafluoroisopropyl)benzenesulfonic acid.

The aqueous solution of sulfonic acid was then neutralized with 10% sodium hydroxide to form an aqueous solution of the corresponding sodium salt. About 1.1 parts of unreacted 1,3-bis(heptafluoroisopropylbenzene were removed from the aqueous solution of the sodium salt by extraction with diethyl ether. The aqueous solution was then concentrated to give a solution containing about 1% of the sodium salt.

Surface tension measurement of the 1% solution of sodium salt gave a value of 21.8 dynes per square centimeter, indicating a high degree of surface activity.

EXAMPLE 4

Preparation of postassium 1,3-bis(heptafluoroisopropyl)-benzenesulfonate

An aqueous solution of 1,3-bis(heptafluoroisopropyl)-benzenesulfonic acid, prepared as described in Example 3, was neutralized with 10% potassium hydroxide to form an aqueous solution of the corresponding potassium salt. The potassium salt was filtered off, washed with water and air dried.

A 1% solution of the potassium salt gave a surface tension value of 23.0 dynes per square centimeter, indicating a high degree of surface activity.

When tested against pea aphides (*Macrosiphum pisi*), the potassium salt (2 pounds per 100 gallons of 50:50 acetone: water) killed 100% of the insects. The test was carried out by removing the pea aphids from infested broad bean plants, placing them on a wire screen and spraying them with the formulation. Following treatment, the pea ahpids were confined to untreated broad bean plants. Record of kill was made three days after treatment.

EXAMPLE 5

Preparation of 1,3-bis(heptafluoroisopropyl)benzenesulfonyl chloride

A mixture of 100 parts of 1,3-bis(heptafluoroisopropyl)benzene and 75 parts of stabilized liquid sulfur trioxide were refluxed to 74° C. for 5 hours in a reaction vessel. Unreacted sulfur trioxide was removed by distillation. 100 parts of chlorosulfonic acid were then added, and the mixture was refluxed overnight, cooled and poured into water. Aqueous and organic layers formed. The organic layer was taken up in chloroform, washed with water and fractionally distilled. 63 parts of 1,3-bis(heptafluoroisopropyl)benzenesulfonyl chloride having a boiling point of 70–74° C. at 1–2 mm. pressure were obtained.

Fluorine analysis of the product gave a value of 51.0% (theoretical—51.8%).

EXAMPLE 6

Preparation of 1,3 - bis(heptafluoroisopropyl)benzenesulfonyl fluoride 100 parts of 1,3-bis(heptafluoroisopropyl)benzene and 75 parts of stabilized liquid sulfur trioxide were mixed and refluxed for 16 hours in a reaction vessel. Unreacted sulfur trioxide was removed by distillation, and 150 parts of fluorosulfonic acid were added. The mixture was then heated for 20 hours on a steam bath at 95° C., poured into ice-water and stirred until an organic layer separated. The organic layer was taken up in chloroform, washed with cold water, dried and fractionally distilled. 82 parts of 1,3-bis(heptafluoroisopropyl)benzenesulfonyl fluoride boiling at 180–193° C. were obtained.

Infrared spectrum analysis of the product showed a sulfonyl fluoride absorption band at 6.8 to 7.0 microns and strong $CF_3$ absorption bands between 7.5 and 8.5 microns. Elemental analysis of the product gave the following results:

Calculated (percent): F, 57.0, H, 0.60. Found (percent): F, 52.2, H, 0.57.

The following test illustrates the oil repellency properties exhibited by fabric treated with 1,3-bis(heptafluoroisopropyl)benzenesulfonyl chloride.

A sample of mercerized cotton fabric was stirred with 30 parts of 1,3-bis(heptafluoroisopropyl)benzenesulfonyl chloride and 18 parts of pyridine for 24 hours at room temperature. The fabric was squeezed dry and washed with water until the pyridine odor disappeared. The fabric was then dried in an air-circulating oven at 100° C. and subjected to the oil repellency test described in Textile Research Journal, 32, 320 (1962). The treated fabric was found to have a rating of 70, indicating that it possessed oil repellency properties.

Since various changes and modifications may be made in this invention without departing from the spirit thereof, the invention is deemed to be limited only by the scope of the appended claims.

We claim:
1. A member of the group consisting of 5-sulfo-1,3-bis(heptafluoroisopropyl)benzene and its corresponding alkali metal, calcium, barium, zinc and ammonium salts, sulfonyl chloride and sulfonyl fluoride.
2. 5-sulfo-1,3-bis(heptafluoroisopropyl)benzene.
3. 5-chlorosulfonyl - 1,3 - bis(heptafluoroisopropyl) benzene.
4. 5-fluorosulfonyl - 1,3 - bis(heptafluoroisopropyl) benzene.
5. A metal salt of 5-sulfo-1,3-bis(heptafluoroisopropyl) benzene in which the metal is a member of the group consisting of alkali metals, calcium, barium and zinc.
6. An alkali metal salt of 5-sulfo-1,3-bis(heptafluoroisopropyl)benzene.

7. The sodium salt of 5-sulfo-1,3-bis(heptafluoroisopropyl)benzene.

8. The potassium salt of 5-sulfo-1,3-bis(heptafluoroisopropyl)benzene.

References Cited

UNITED STATES PATENTS

| | | | |
|---|---|---|---|
| 2,732,398 | 1/1956 | Brice et al. | 260—543 |
| 2,862,974 | 12/1958 | Sieglitz et al. | 260—505 |
| 2,957,031 | 10/1960 | Drysdale | 260—505 |
| 3,281,426 | 10/1966 | Tiers | 260—543 |

BERNARD HELFIN, Primary Examiner

L. DECRESCENTE, Assistant Examiner

U.S. Cl. X.R.

106—2; 260—429.9, 543, 651, 618; 252—161, 353, 8.7; 424—303